(12) United States Patent
Zanone et al.

(10) Patent No.: US 8,743,083 B2
(45) Date of Patent: Jun. 3, 2014

(54) DUAL MODE TOUCHPAD WITH A LOW POWER MODE USING A PROXIMITY DETECTION MODE

(75) Inventors: Jean-Daniel Zanone, Renens (CH); Mathieu Meisser, La Conversion/Lutry (CH); Simone Arrigo, Denges (CH); Julien Piot, Rolle (CH)

(73) Assignee: Logitech Europe, S.A., Morges (CH)

( * ) Notice: Subject to any disclaimer, the term of this patent is extended or adjusted under 35 U.S.C. 154(b) by 295 days.

(21) Appl. No.: 13/273,167

(22) Filed: Oct. 13, 2011

(65) Prior Publication Data

US 2012/0127124 A1      May 24, 2012

Related U.S. Application Data (60) Provisional application No. 61/393,764, filed on Oct. 15, 2010.

(51) Int. Cl.
*G06F 3/045* (2006.01)

(52) U.S. Cl.
USPC .......................... 345/174; 345/173; 178/18.01

(58) Field of Classification Search
USPC .................................................. 345/173–179
See application file for complete search history.

(56) References Cited

U.S. PATENT DOCUMENTS

| | | | |
|---|---|---|---|
| 2008/0246723 A1* | 10/2008 | Baumbach | 345/156 |
| 2009/0184939 A1* | 7/2009 | Wohlstadter et al. | 345/173 |
| 2010/0253638 A1* | 10/2010 | Yousefpor et al. | 345/173 |
| 2011/0185316 A1* | 7/2011 | Reid et al. | 715/863 |

* cited by examiner

*Primary Examiner* — Premal Patel
(74) *Attorney, Agent, or Firm* — Kilpatrick Townsend & Stockton LLP (57) ABSTRACT

A system includes a touchpad sensor array, a touch circuit, and a proximity circuit. The touch circuit executes a touch mode configured to track the position of a user or conductive object on the touchpad sensor array by detecting a change in an electrical property of the touchpad. The proximity circuit executes a proximity detection mode configured to track the position of a user or conductive object near or proximate to the touchpad sensor array by detecting a change in an electrical property of the touchpad. The system is configured to switch from the touch mode to the proximity detection mode after a predetermined period of inactivity, where the proximity detection mode can operate at one or more reduced polling rates, resulting in a reduced overall power dissipation. The system is configured to switch back to the touch mode when activity is detected by the proximity circuit.

19 Claims, 7 Drawing Sheets

Touchpad with proximity sensing used for low power modes
High-level state machine

DUAL MODE TOUCHPAD WITH A LOW POWER MODE USING A PROXIMITY DETECTION MODE

CROSS-REFERENCES TO RELATED APPLICATIONS

The present non-provisional application claims benefit of U.S. Provisional Patent Application No. 61/393,764, filed on Oct. 15, 2010, and entitled "Dual Mode Touchpad with a Low Power Mode Using a Proximity Detection Mode," which is hereby incorporated by reference in its entirety for all purposes.

BACKGROUND OF THE INVENTION

Touchpads are input devices that typically include a resistive or capacitive sensor or sensor array configured to translate the position and motion of a user's finger or conductive object on the touchpad into positional information. This positional information can be used, for example, to control the movement of a cursor on a computer screen. Touchpads are commonly included in laptop computers and can be used instead of or in combination with a computer mouse. Touchscreens can be a transparent form of a touchpad and are typically disposed on a video screen. Touchscreens are commonly included in monitors, smart phones, portable media players, personal digital assistants (PDAs), etc., for button selection, manipulating graphical objects, and the like.

Touchpads are typically polled by a touch circuit (e.g., processor) at a relatively high polling rate so that relatively fine movements or fast movements made by a finger or stylus can be detected for accurate cursor control. High polling rates can significantly increase power consumption and reduce the overall power efficiency in touchpad systems. Power consumption considerations are of particular importance for battery-operated and/or portable devices which can experience a significantly reduced battery life or battery charge (e.g., for rechargeable batteries) as a result of high polling rates on touchpad devices.

As more battery-operated and portable electronics become more common in today's marketplace, touchpad developers and manufacturers strive to develop more power efficient designs for touchpad systems.

SUMMARY OF THE INVENTION

The present invention generally relates to touch-based interface systems. More specifically, embodiments of the present invention provide a touchpad system having proximity detection capabilities to provide for reduced power consumption and improved overall efficiency.

In certain embodiments, a system includes a touch-based interface (e.g., touchpad) and a proximity circuit electronically coupled to the touch-based interface. The touch-based interface comprises a touchpad sensor array, a set of drive electronics, and a set of sense electronics. The touch-based interface is alternatively referred to as a touchpad in the present specification. The proximity circuit is configured to detect a change in an electrical property of the touchpad sensor array to detect a user adjacent to the touchpad but not touching the touchpad. The system further includes a touch circuit electronically coupled to the touchpad sensor array. The touch circuit is configured to detect a change in an electrical property of the touchpad to detect a touch on the touchpad. If the proximity circuit is electronically monitoring the touchpad, the touch circuit is electronically decoupled from the touchpad. If the touch circuit is electronically monitoring the touchpad, the proximity circuit is electronically decoupled from the touchpad.

According to certain embodiments, the touchpad is a capacitive device. The touchpad sensor includes a touchpad sensor array, a set of drive electronics, and a set of sense electronics. In some embodiments, the set of drive electronics are coupled to the touchpad sensor array and one or more of the touch circuit and proximity circuit. In some embodiments, the set of sense electronics are coupled to the touchpad sensor array and one or more of the touch circuit and proximity circuit.

If the touch circuit is configured to monitor the touchpad for a touch mode of operation, after an inactivity time of the touchpad, the proximity circuit is configured to monitor the touchpad for a proximity mode of operation and the touch circuit is electronically decoupled from the touchpad. In certain embodiments, the inactivity time can be 5 seconds or greater.

In certain embodiments, if the proximity circuit is configured to monitor the touchpad, after a second inactivity time of the touchpad, a polling rate of the proximity circuit is reduced from a first polling rate to a second polling rate. In some embodiments, the first polling rate is at least ten times faster than the second polling rate. In other embodiments, the first polling rate can be one poll per millisecond and the second polling rate can be 1 poll per 10 milliseconds or greater (e.g., 1 poll per 50 milliseconds). In yet other embodiments, the second inactivity time can be 5 minutes or greater. In alternative embodiments, if the proximity circuit detects a proximity event, the proximity circuit is electronically decoupled from the touchpad and the touchpad circuit is configured to monitor the touchpad.

According to one embodiment, the proximity circuit and the touch circuit are discrete integrated circuits. In other embodiments, the proximity circuit and the touch circuit are a single integrated circuit. In alternative embodiments, the proximity circuit is configured to monitor electrodes and/or lines of the touchpad that are not monitored by the touch circuit in the touch mode of operation. In further embodiments, the touchpad and the electrodes and/or lines includes a ground plane electrode and a guard ring electrode.

According to some embodiments, a system comprises one or more data processors and a computer-readable storage medium coupled to the processor, the computer readable storage medium comprising code executable by the one or more data processor(s) for implementing a method. The method comprises operating the system in a touchpad mode, switching operation of the system to a proximity detection mode after a first predetermined period of inactivity, and switching operation of the system back to the touchpad mode from the proximity detection mode if the proximity detection mode detects activity.

In certain embodiments, wherein the proximity detection mode operates in a first low power mode after the first predetermined period of inactivity. The proximity detection mode can operate in a second low power mode after a second predetermined period of inactivity, where the touchpad system consumes less power in the second low power mode than in the first low power mode. In some embodiments, the first predetermined period of inactivity if 5 seconds or more, up to the second predetermined period of inactivity, and the second predetermined period of inactivity is 5 minutes or greater. In other embodiments, the first predetermined period of inactivity is 5 seconds and the second predetermined period of inactivity is 5 minutes. The touchpad mode can have a first polling rate, the first low power mode has a second polling rate, and the second low power mode has a third polling rate, where the second polling rate is slower than the first polling rate, and wherein the third polling rate is slower than the second polling rate.

In certain embodiments, the system comprises a touchpad sensor array, drive lines coupled to the touchpad sensor array, sense lines coupled to the touchpad sensor array, a touch circuit coupled to the drive lines and sense lines, and a proximity detection circuit coupled to the touch circuit. The touch circuit executes the touchpad mode and a proximity detection circuit executes the proximity detection mode. In some embodiments, the proximity detection circuit is inactive when the touch circuit is enabled, and the touch circuit is inactive when the proximity detection circuit is enabled. In other embodiments, the proximity detection mode is configured to detect activity from within 5 cm from the touchpad sensor array, where the activity includes one or more of a finger or conductive touch object.

In some embodiments, a method of operating a system (e.g., a touchpad system) includes operating the system in a touchpad mode of operation. The method further includes determining passage of a first predetermined period of inactivity and operating the system in a proximity detection mode of operation. The method can further include detecting activity and operating the system in the touchpad mode of operation. In certain embodiments, the proximity detection mode is characterized by a first power consumption level. In other embodiments, when in the proximity detection mode of operation, the method includes determining passage of a second predetermined period of inactivity, where the proximity detection mode is characterized by a second power consumption level less than the first power consumption level.

In some embodiments, the first predetermined period of inactivity is 5 seconds or more, up to the second predetermined period of inactivity. The second predetermined period of inactivity is 5 minutes or greater. In other embodiments, the touchpad mode is characterized by a first polling rate, the first power consumption level is associated with a second polling rate, and the second power consumption level is associated with a third polling rate. In certain embodiments, the second polling rate is slower than the first polling rate and the third polling rate is slower than the second polling rate. In alternative embodiments, detecting activity includes detecting activity from within 5 cm from a touchpad sensor array and detecting activity can include detecting at least one of a finger or a conductive object.

A better understanding of the nature and advantages of the present invention may be gained with reference to the following detailed description and the accompanying drawings.

DETAILED DESCRIPTION OF THE INVENTION

The present invention generally relates to touchpad systems. More specifically, embodiments of the present invention provide a touchpad system having proximity detection capabilities to provide for reduced power consumption and improved overall efficiency.

According to an embodiment, a touchpad system includes a touchpad sensor array, a touch circuit, and a proximity circuit. The touch circuit executes a touch mode configured to track the position of a user or conductive object on the touchpad sensor array by detecting a change in an electrical property of the touchpad. The proximity circuit executes a proximity detection mode configured to track the position of a user or conductive object near or proximate to the touchpad sensor array by detecting a change in an electrical property of the touchpad. The touchpad system is configured to switch from the touch mode to the proximity detection mode after a predetermined period of inactivity, where the proximity detection mode can operate at one or more reduced polling rates, resulting in a reduced overall power dissipation. The touchpad system is configured to switch back to the touch mode when activity is detected by the proximity circuit.

Touchpad systems can use a variety of touch sensing technologies including, but not limited to, capacitive sensors and resistive sensors. Touchpad sensors can be disposed in linear configurations, multi-dimensional arrays, as buttons, and the like. Resistive sensors (e.g., touch pads, touch screens) are typically composed of two flexible sheets coated with a resistive material and separated by an air gap. The two sheets have conductive lines that can be disposed on the sheets in a variety of configurations (e.g., horizontal and vertical lines). When contact is made to the surface of the touch pad, the two sheets are pressed together and the conductive lines on the opposing sheets make an electrical contact or connection. The location of the electrical contact allows a processor (e.g., touch circuit) to determine the location of the touch object (e.g., finger, conductive object, etc.) on the given sensor array. Resistive touch pads are a type of "passive" technology and can sense contact with nearly any object (finger, stylus/pen, palm, non-conductive object), In certain embodiments, capacitive sensor arrays operate by creating an electrical field on the array, which is measurable by a touch circuit controller (e.g., touch circuit, processor, etc.). The touch circuit is further configured to detect distortions in the electrical field caused by a contacting or proximate object (e.g., finger or stylus). Capacitive sensors can be disposed in a variety of configurations including buttons, linear arrays, two-dimensional arrays and the like. Furthermore, capacitive sensors can be manufactured from different types of materials including copper, printed ink, and indium tin oxide (ITO). Certain embodiments of copper capacitive sensors can be disposed on a variety of surfaces including FR4 printed circuit boards, flexible materials, or other substrates that would be known by those of ordinary skill in the art. Capacitive sensor accuracy, resolution, and performance characteristics can be affected by a variety of parameters, including the size and spacing between adjacent sensors, a sensor's relative distance to the ground plane, and the polling rate of the touch circuit. As described above, the location of the distortion or change in the electric field can be sent to a controller for processing. In some embodiments, capacitive sensors typically include one or more of a self capacitance sensor array or a mutual capacitance sensor array.

In mutual capacitance sensor arrays, a touch circuit typically drives a set of column electrodes with an AC signal. The touch circuit may drive each set of column electrodes with a drive circuit and/or drive lines. In some embodiments, the drive circuit can be a multiplexor (MUX). The column electrodes mutually couple the signal to the row electrodes and the touch circuit senses certain electrical characteristics of that signal (e.g., magnitude, phase, frequency, etc.) by a sense circuit and/or sense lines. In some embodiments, the sense circuit can be a MUX. The row and column electrodes can be overlapping, orthogonal, or disposed in other configurations known by those of ordinary skill in the art. For example, the rows and columns of electrodes can be perpendicular such as on an X-Y axis. It should be noted that the row and column electrodes can function interchangeably where either set of electrodes can perform the drive and sense functions as described herein.

Mutual capacitive sensors can have a capacitor at each intersection of each row and each column of the array. In certain embodiments, each row and column of capacitive electrodes are scanned sequentially in a predetermined order to provide the touch circuit with a "map" of the electrical field created by mutually coupled signal across the entire array. An object (e.g., finger, stylus, conductive object, etc.) can alter the mutual coupling between row and column electrodes in the array. Bringing the object near the surface of the sensor changes the local electric field which reduces the mutual capacitance between the overlapping electrodes. As described above, the capacitance change at every individual point on the grid can be measured to accurately determine the touch location by measuring the voltage in the other axis. Mutual capacitance allows multi-touch operation where multiple fingers, palms or stylus can be tracked at the same time.

Self-capacitance sensors (or sensor arrays) can have the same X-Y sensor array configuration as mutual capacitance sensor arrays, but the columns and rows operate independently. With self-capacitance, the capacitive load of a conductive object (e.g., finger, stylus, etc.) is measured on each column or row electrode, as opposed to measuring a signal across an entire row or column of electrodes as is typically done in mutual capacitance sensor arrays. The capacitive load increases the parasitic capacitance to ground thus changing the electric field of the array. The touch circuit is configured to detect those changes and determine the position of the touch object with respect to the self-capacitance sensor array.

Figure 1:
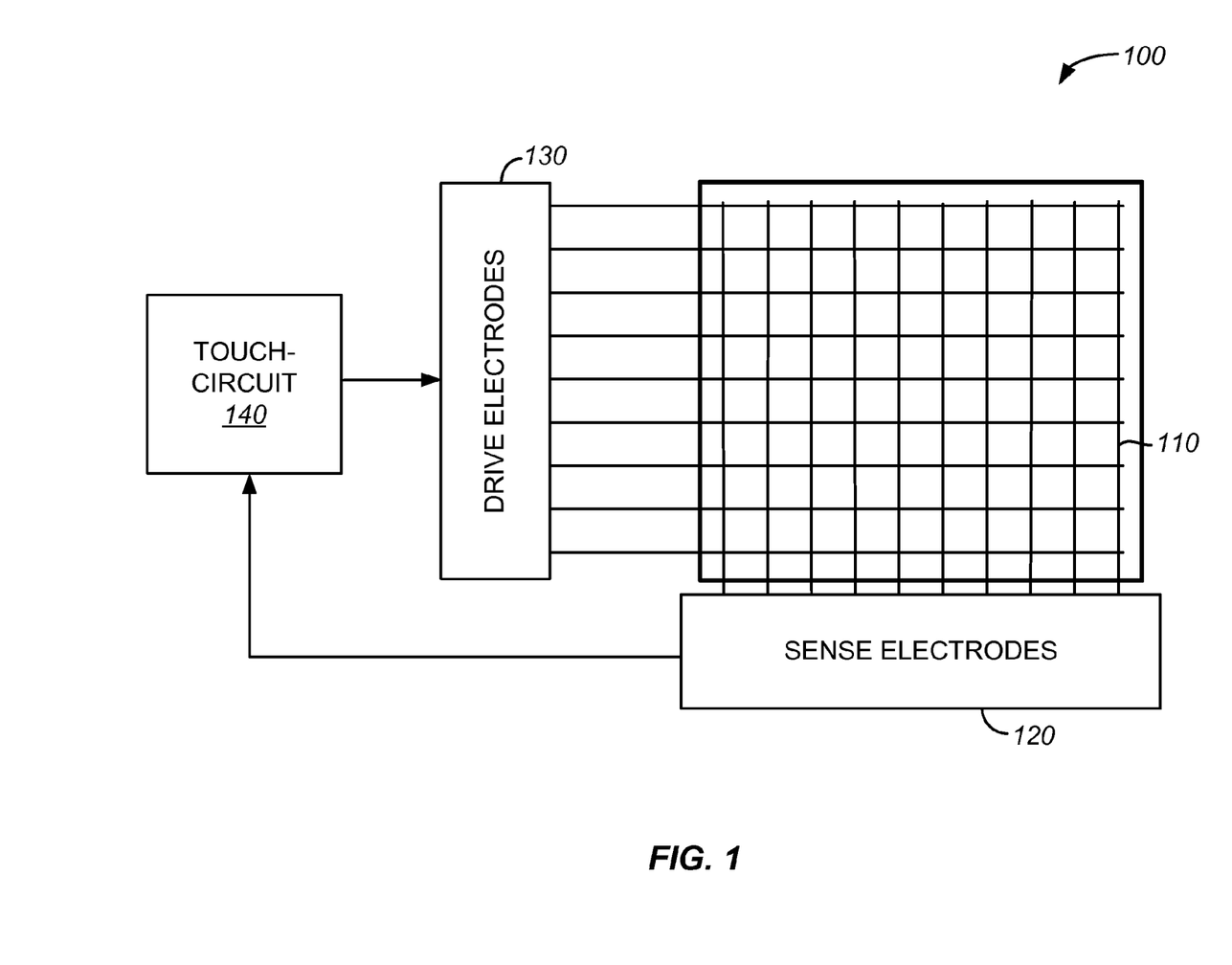
FIG. 1 is a simplified schematic of a touchpad system according to an embodiment of the present invention.

FIG. 1 is a simplified schematic of a touchpad system 100 according to an embodiment of the present invention. The touchpad system 100 includes a touchpad sensor array 110, a set of sense electrodes 120, a set of drive electrodes 130, and a "touch" circuit 140. In certain embodiments, the touch circuit 140 can be a processor, a controller, an ASIC (application specific integrated circuit), or other control logic (e.g., programmable logic device (PLD) or field programmable gate array (FPGA) for executing the method and controlling the touch circuit. The touchpad sensor array 110 is a self-capacitance array, in an embodiment. Alternatively, the touchpad sensor array 110 can be a mutual capacitance sensor array or a resistive sensor array. In some embodiments, the sense electrodes 120 and drive electrodes 130 can be referred to as sense lines 120 and drive lines 130.

In certain embodiments, each row and column of the capacitive electrodes of the touchpad sensor array 110 are driven and sensed by the touch circuit 140 by way of the drive electrodes 130 and sense electrodes 120. Each column and row of electrodes are scanned sequentially in a predetermined order to provide the touch circuit with a "map" of the electrical field across the entire touchpad sensor array 110. The touch circuit 140 is configured to detect signal changes on the touchpad sensor array 110 generated by a user touching the touchpad sensor array with a touch object (e.g., finger or stylus). As described above, these signal changes can cause distortions in the electric field on the touchpad sensor array 110. The touch circuit 140 is configured to determine the position of the touch object based on the distortions in the electric field as the touch object moves across the touchpad sensor array 110.

Figure 2:
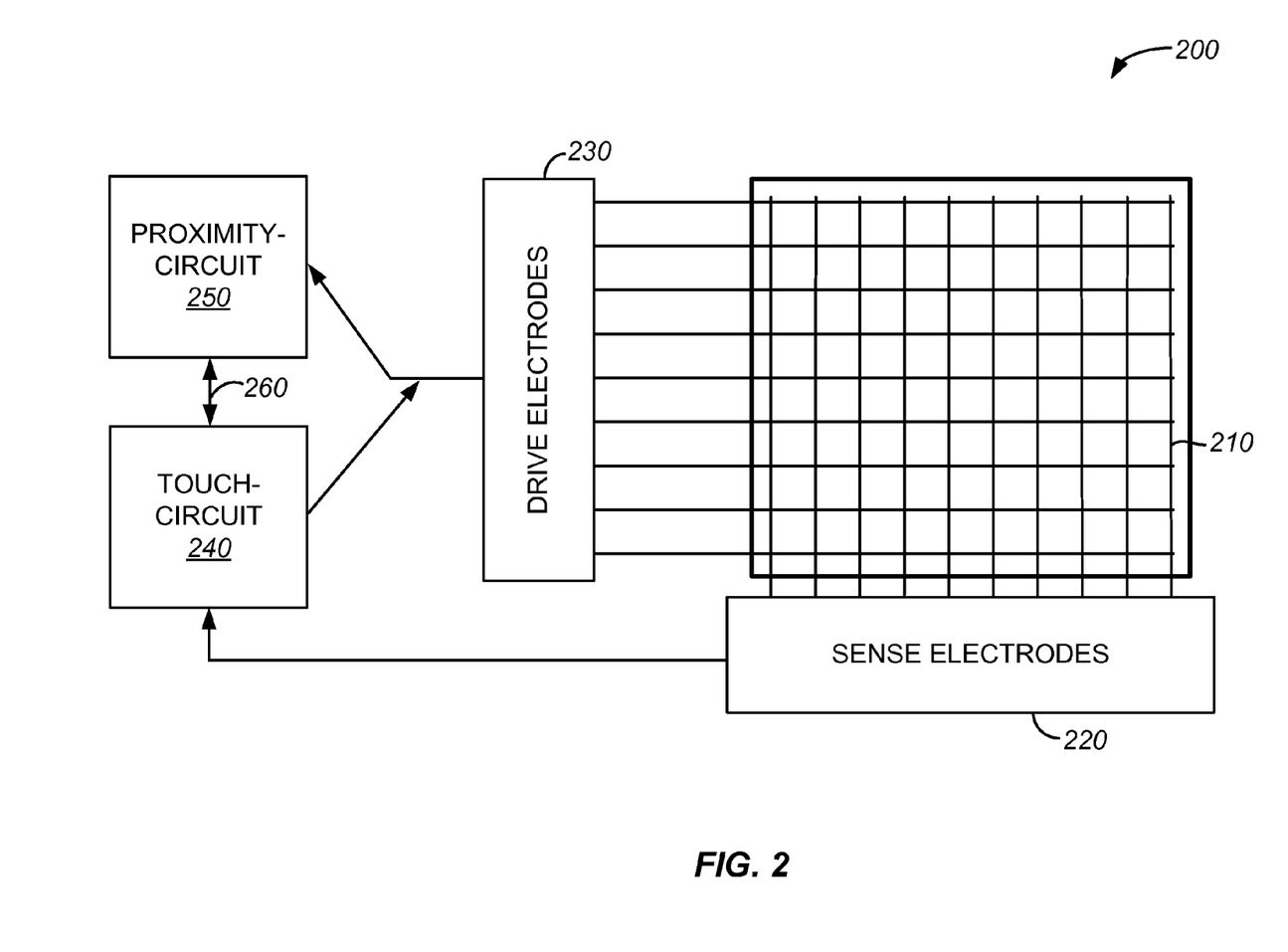
FIG. 2 is a simplified schematic of a touchpad system according to another embodiment of the present invention.

FIG. 2 is a simplified schematic of a touchpad system 200 according to another embodiment of the present invention. The touchpad system 200 includes a touchpad sensor array 210, a set of sense electrodes 220, a set of drive electrodes 230, a touch circuit 240, and a proximity circuit 250. The touchpad sensor array 210, sense electrodes 220, and drive electrodes 230 can be referred collectively as a "touchpad" or "touch-based interface." In certain embodiments, the touch circuit 140 and/or proximity circuit 250 can be a processor, a controller, an ASIC, or other control logic (e.g., PLD, FPGA) for executing the method and controlling the touch circuit 240 and/or proximity circuit 250. Alternatively, the set of sense electrodes 220 and set of drive electrodes 230 can be replaced by a set of sense lines (i.e., sense electronics) 220 and drive lines (i.e., drive electronics) 230, each including a multiplexor (MUX) to drive and/or sense each respective row and column of electrodes on the touchpad sensor array 210. The touchpad sensor array 210 is a self-capacitance array. Alternatively, the touchpad sensor array 210 can be a mutual capacitance sensor array or a resistive sensor array. It should be noted that the various embodiments (e.g., proximity detection and low power modes) described herein can also be applied to other touch-based technologies including, but not limited to, optical technology (e.g., light emitting diode (LED)) based touch systems using light in the visible and/or non-visible spectrums. In some embodiments, the touchpad system 200 can be a touchpad on a computing device (e.g., laptop computer, netbook, etc.). In other embodiments, the touchpad system 200 can be a touch screen (e.g., touch screen monitor, smart phone, personal digital assistant (PDA), etc.) where, for example, the touch sensitive elements are disposed above or below a display or screen. It should be noted that these are merely examples and the touch system 200 can be adapted for use in any electronic device as would be appreciated by one of ordinary skill in the art with the benefit of this disclosure.

In certain embodiments, the touch circuit 240 is in electronic communication with the proximity circuit 250. The touch circuit 240 is coupled to the drive electrodes 230 and the sense electrodes 220. The proximity circuit 250 is further coupled to the drive electrodes 230. Alternatively, the proximity circuit can be coupled to the sense electrodes 220. The touchpad sensor array 210, the set of sense electrodes 220, and the set of drive electrodes 230 are sometimes referred to herein collectively as a touchpad.

In certain embodiments, the touch circuit 240 is an integrated circuit. Each row and column of the capacitive electrodes of the touchpad sensor array 210 can be driven and sensed by the touch circuit 240 by way of the drive electrodes 230 and sense electrodes 220. Each column and row of electrodes are scanned sequentially in a predetermined order to provide the touch circuit 240 with a "map" of the electrical field across the entire touchpad sensor array 210. Signal changes or fluctuations can be generated by a user touching the touchpad sensor array 210 with a finger or conductive object (e.g., stylus, etc.). The touch circuit 240 is configured to detect these signal fluctuations or distortions and generate position information of a user's finger on the touchpad. For convenience herein, a user touch will be described as a user's finger touching the touchpad. It is to be understood that a user touching the touchpad is not so limited and that the touchpad may sense other parts of a user's body (e.g., palm, foot, etc.) touching the touchpad. Though touching the touchpad with a stylus may not be discussed specifically herein, it is to be understood that any description of a user touching the touchpad with a finger can also be applicable to a stylus or other conductive object touching the touchpad.

The proximity circuit 250 can be an integrated circuit configured to detect signal changes from the touchpad sensor array 210 generated by a user moving a finger or conductive object from within a certain distance proximate to the touchpad sensor array 210. According to some embodiments, the proximity circuit 250 can detect a finger or conductive object from up to approximately 5 centimeters from the touch pad sensor array 210. In certain embodiments, the proximity circuit 250 begins detection of a finger or conductive object after a predetermined period of inactivity (i.e., timeout period). For example, if the touch circuit 240 does not detect a finger or conductive object at or near the touchpad sensor array 210 for a given amount of time (e.g., 5 seconds, 10 seconds, etc.), the touch circuit 240 is deactivated (e.g., decoupled) and the proximity circuit 250 is enabled (i.e., activated). The proximity circuit 250 is configured to place the touchpad system 200 in various power saving modes of operation during the period of inactivity, as further described below with respect to FIG. 3.

According to certain embodiments, the proximity circuit 250 is inactive (e.g., does not monitor the touchpad sensor array 210) while the touch circuit 240 is monitoring the touchpad sensor array 210 (i.e., the touch circuit 140 is enabled). The proximity circuit 250 can be rendered inactive by electrically decoupling or isolating from the touchpad sensor array 210 via a set of switches, relays, a high impedance mode, or the like, where monitoring of the touchpad sensor array 210 by the touch circuit 240 is not affected by the proximity circuit 250. Methods of decoupling or electrically isolating the proximity circuit 250 from the touchpad sensor array 210 would be known by those of ordinary skill in the art with the benefit of this disclosure.

According to other embodiments, the touch circuit 240 is inactive (e.g., does not monitor the touchpad sensor array 210) while the proximity circuit 250 is monitoring the touchpad sensor array 210. For example, the touch circuit 240 can be electrically decoupled or isolated from the touchpad sensor array 210 via a set of switches, relays, a high impedance mode, or the like where monitoring the touchpad sensor array 210 by the proximity circuit 250 is not effected by the touch circuit 240. Methods of electrically decoupling or isolating the touch circuit 240 from the touchpad sensor array 210 would be known by those of ordinary skill in the art with the benefit of this disclosure. According to some embodiments, the touch circuit 240 and proximity circuit 250 are configured to communicate via a set of communication lines 260, for example, during the switch between touch mode and proximity detection mode of the touchpad sensor array 210, as further described below with respect to FIG. 3.

Figure 3:
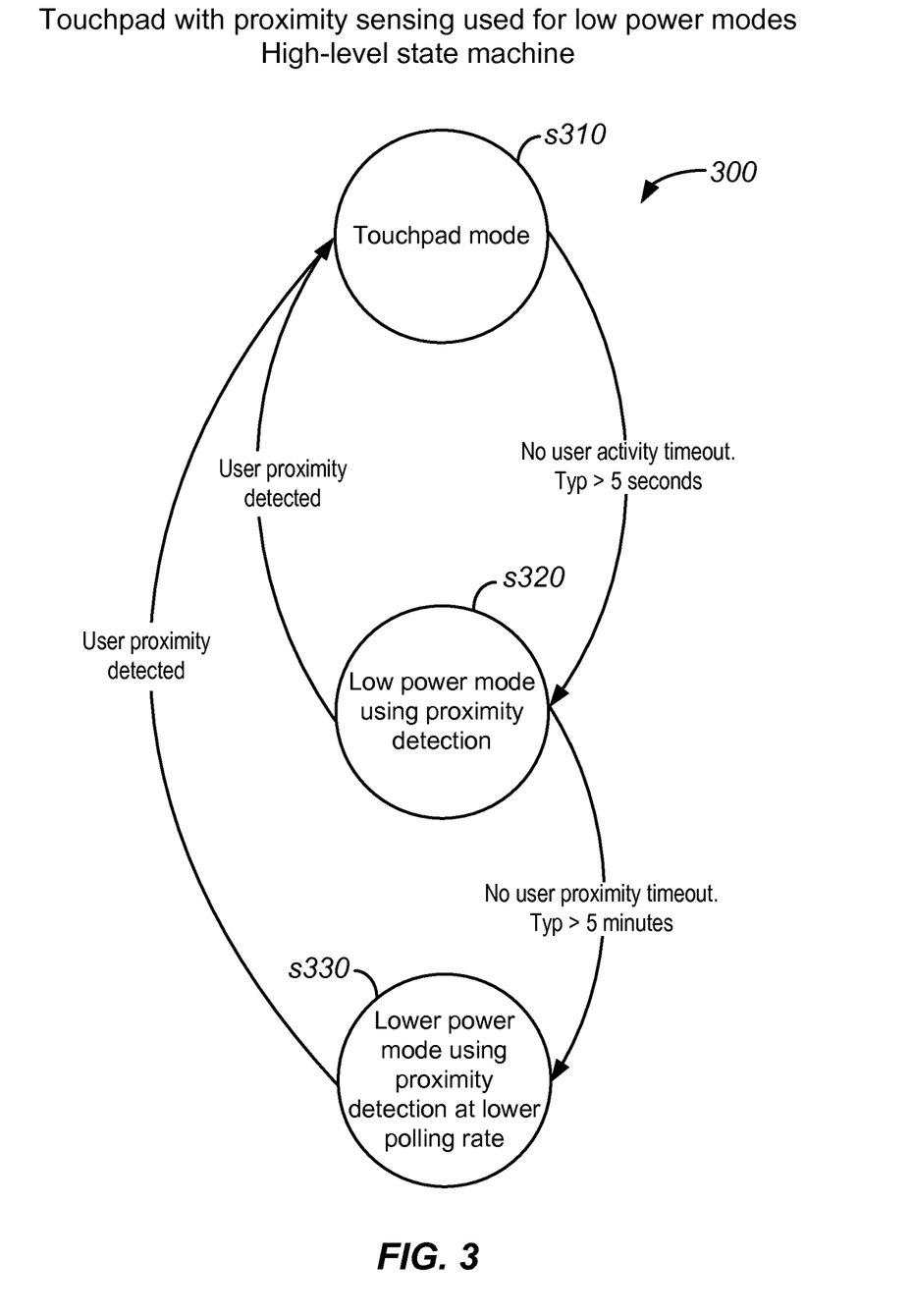
FIG. 3 is a state machine illustrating an aspect of proximity sensing and power management on the touchpad system, according to an embodiment of the invention.

FIG. 3 is a state machine 300 illustrating an aspect of proximity sensing and power management on the touchpad system 200, according to an embodiment of the invention. At state s310, the touchpad system 200 is in the touchpad mode of operation. As described above, the touchpad mode can include the touch circuit 240 tracking the position of a finger or conductive object on the touchpad sensor array 210. In one exemplary case, the touch system 200 scans the touch sensor array 210 at a first polling rate. The first polling rate can be set to any desirable rate that preferably scans a user's finger or a conductive object fast enough for a given application. For example, if accuracy and high definition of quick or small movements of a finger are required, a high polling rate can be utilized (e.g., 1 scan per 1 ms or faster). Alternatively, if lower movement definition or accuracy is allowable, a lower polling rate can be used in the tracking mode (e.g., 1 scan per 10 ms, etc.). In certain embodiments, the proximity detection mode (e.g., performed by proximity circuit 250) is inactive while the touchpad system 200 is in the touchpad mode (e.g., touch circuit 240 active).

In some embodiments, if the touch circuit 240 does not detect contact or movement by a finger or conductive object for a first predetermined period of time (i.e., first timeout), the touch system 200 enters a first low power mode (s320). In one non-limiting example, the first predetermined period of time can be 5 seconds. Other first timeout periods can be used as necessary for the given application (e.g., 10 seconds, 20 seconds, etc). Typically, during the transition from the normal mode to the first low power mode, the proximity circuit 250 activates and the touch circuit 240 deactivates. The first low power mode reduces the polling rate of the touch pad sensor array 210 to effectively lower the power dissipation of the touch system 200. For example, a first polling rate (e.g., normal mode) may be one poll per millisecond. The second polling rate (e.g., first low power mode) may be 1 poll per 10 milliseconds. These polling rates are exemplary and other polling rates may be used by the touchpad system. Lowering the polling rate of the proximity circuit effectively lowers the power consumption of the touchpad system.

As described above, the proximity circuit 250 is configured to detect a proximity event at or near the touchpad sensor array 210 (e.g., a user's finger of conductive object moved within 5 cm from the touchpad sensor array 210). If the proximity circuit 250 detects a proximity event at any time between the first predetermined period of time (first timeout period) and a second predetermined period of time (a second timeout period), then the touchpad system 200 reenters the touchpad mode or "normal mode" of operation (s310). As described above, in the normal mode of operation, the touchpad system 200 activates the touch circuit 240 for normal finger/stylus position tracking, and deactivates the proximity detection circuit 250. In certain embodiments, if the proximity circuit 250 does not detect a proximity event (e.g., a user's finger moved within 5 centimeters of the touchpad) after the first timeout period and a second timeout period, the polling rate of the proximity circuit 250 is reduced from a second polling rate to a third polling rate (state s330). In some embodiments, the second timeout period can be 5 minutes. It should be noted that timeout periods (e.g., first timeout period, second timeout period, etc.) with different durations can be used as required by the touch system 200.

According to some embodiments, the polling rate of the proximity circuit may be further lowered after a second inactively time, a third inactivity time, etc. The second inactivity time can be 5 to 8 minutes, or as may be required. After the second inactivity time has passed the polling rate can be reduced to 1 poll per 100 milliseconds. The third inactivity time may be 10 minutes or greater. After the third inactivity time has passed the polling rate may be further reduced to 1 poll per 500 milliseconds. With each reduction in the polling rate, the power consumed by the touchpad system is further reduced. In certain embodiments, the touchpad system 200 returns to the touchpad mode (e.g., normal mode) once a proximity event is detected regardless of the particular low power mode that the touchpad system 200 is currently operating in.

Figure 4:
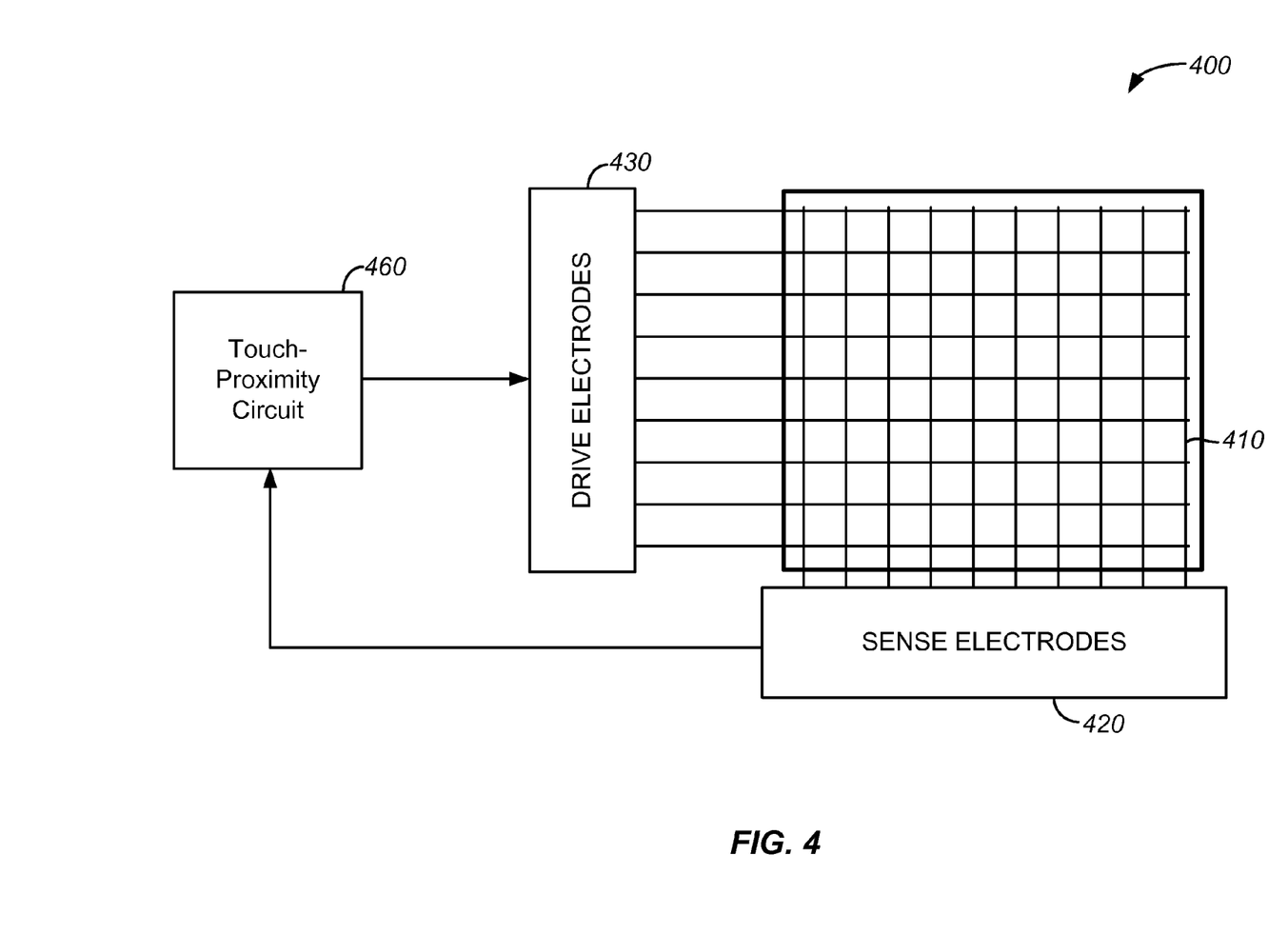
FIG. 4 is a simplified schematic of a touchpad system according to yet another embodiment of the present invention.

FIG. 4 is a simplified schematic of a touchpad system 400 according to yet another embodiment of the present invention. The touchpad system 400 includes a touchpad sensor array 410, a set of sense electrodes 420, a set of drive electrodes 430, and touch-proximity circuit 460. The touchpad sensor array 410, sense electrodes 420, and drive electrodes 430 can be referred collectively as a "touchpad" or "touch-based interface." In certain embodiments, the touch-proximity circuit 460 can be a processor, a controller, an ASIC, or other control logic (e.g., PLD, FPGA) for executing the method and controlling the touch-proximity circuit 460. Alternatively, the set of sense electrodes 420 and set of drive electrodes 430 can be replaced by a set of sense lines (i.e., sense electronics) 420 and drive lines (i.e., drive electronics) 430, each including a multiplexor (MUX) to drive and/or sense each respective row and column of electrodes on the touchpad sensor array 410. In some embodiments, the touchpad sensor array 410 is a self-capacitance array. Alternatively, the touchpad sensor array 410 can be a mutual capacitance sensor array or a resistive sensor array. It should be noted that the various embodiments (e.g., proximity detection and low power modes) described herein can also be applied to other touch-based technologies including, but not limited to, optical technology (e.g., LED) based touch systems using light in the visible and/or non-visible spectrums. In some embodiments, the touchpad system 400 can be a touchpad on a computing device (e.g., laptop computer, netbook, etc.). In other embodiments, the touchpad system 400 can be a touch screen (e.g., touch screen monitor, smart phone, PDA, etc.) where, for example, the touch sensitive elements are disposed above or below a display or screen. It should be noted that these are merely examples and the touch system 400 can be adapted for use in any electronic device as would be appreciated by one of ordinary skill in the art with the benefit of this disclosure.

The touch portion and the proximity portion of touch-proximity circuit 460 are configured to operate similarly to touch circuit 240 and proximity circuit 250 described above. For example, in a touch mode of operation of the touch-proximity circuit 460, the touch circuit portion of touch-proximity circuit 460 is configured to monitor touchpad sensor array 410, and the proximity portion of the touch-proximity circuit is electronically decoupled from the a touchpad sensor array. Furthermore, in a proximity mode of operation of the touch-proximity circuit, the proximity portion of touch-proximity circuit 460 is configured to monitor the touchpad sensor array 410 (i.e., proximity portion is enabled), and the touch portion of the touch-proximity circuit 460 is electronically decoupled from the a touchpad sensor array 410 (i.e., touch portion disabled). Further, touchpad system 400 is configured to operate the power saving method as described above with respect to FIG. 3.

In certain embodiments, each row and column of the capacitive electrodes of the touchpad sensor array 410 are driven and sensed by the touch circuit 440 by way of the drive electrodes 430 and sense electrodes 420. Each column and row of electrodes are scanned sequentially in a predetermined order to provide the touch circuit with a "map" of the electrical field across the entire touchpad sensor array 410. According to some embodiments, the touch-proximity circuit 460 is configured to monitor and detect a finger or conductive object up to approximately 5 centimeters from the touch pad sensor array 410 while in the proximity detection mode. The touch-proximity circuit 460 can be configured to begin detection (proximity mode) of a finger or conductive object not touching but in proximity to the touch sensor array 410 after a predetermined inactivity time. For example, the proximity detection portion can be activated if the touch circuit 240 does not detect a finger or conductive object on the touchpad sensor array 410 for a given amount of time (e.g., 5 seconds, 10 seconds, etc.). The touch-proximity circuit 460 is configured to place the touchpad system 400 in various power saving modes of operation based on the use of the touch system 400 over a period of time. The various modes of operation are further described above with respect to FIG. 3.

Figure 5:
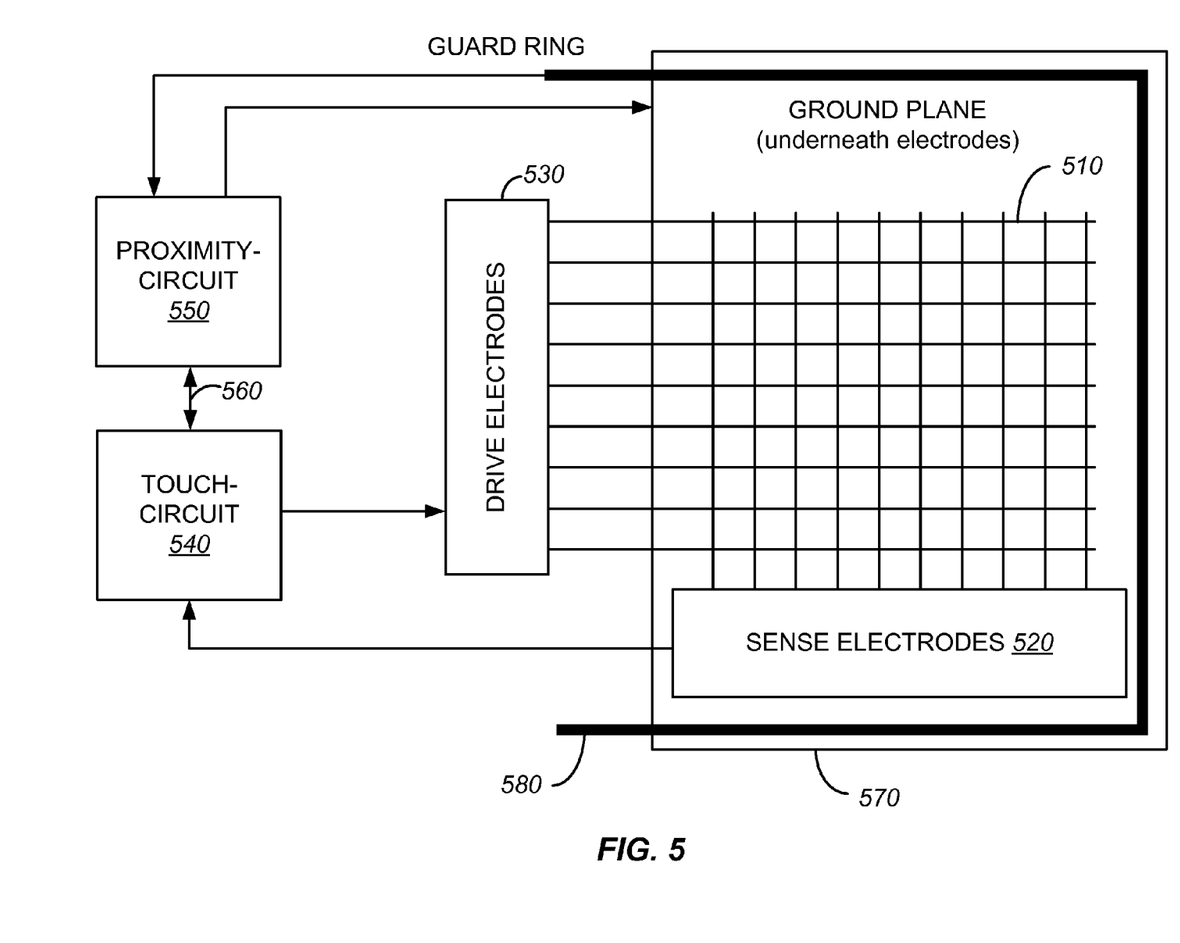
FIG. 5 is a simplified schematic of a touchpad system according to an alternative embodiment of the present invention.

FIG. 5 is a simplified schematic of a touchpad system 500 according to an alternative embodiment of the present invention. The touchpad system 500 includes a touchpad sensor array 510, a set of sense electrodes 520, a set of drive electrodes 530, a touch circuit 540, a proximity circuit 250, a ground plane 570, and a guard ring 580. The touchpad sensor array 510, sense electrodes 520, and drive electrodes 530 can be referred collectively as a "touchpad" or "touch-based interface." In certain embodiments, the touch circuit 540 and/or proximity circuit 550 can be a processor, a controller, an ASIC, or other control logic (e.g., PLD, FPGA) for executing the method and controlling the touch circuit 540 and/or proximity circuit 550. Alternatively, the set of sense electrodes 520 and set of drive electrodes 530 can be replaced by a set of sense lines (i.e., sense electronics) 520 and drive lines (i.e., drive electronics) 530, each including a multiplexor (MUX) to drive and/or sense each respective row and column of electrodes on the touchpad sensor array 510. The touchpad sensor array 510 is a self-capacitance array. Alternatively, the touchpad sensor array 510 can be a mutual capacitance sensor array or a resistive sensor array. It should be noted that the various embodiments (e.g., proximity detection and low power modes) described herein can also be applied to other touch-based technologies including, but not limited to, optical technology (e.g., LED) based touch systems using light in the visible and/or non-visible spectrums. In some embodiments, the touchpad system 500 can be a touchpad on a computing device (e.g., laptop computer, netbook, etc.). In other embodiments, the touchpad system 500 can be a touch screen (e.g., touch screen monitor, smart phone, PDA, etc.) where, for example, the touch sensitive elements are disposed above or below a display or screen. It should be noted that these are merely examples and the touch system 500 can be adapted for use in any electronic device as would be appreciated by one of ordinary skill in the art with the benefit of this disclosure.

Touchpad system 500 is similar to touchpad system 200 in that touchpad system 500 includes touch circuit 540 and proximity circuit 550 as separate integrated circuits. Touch pad system 500 differs from touchpad systems 200 and 400 described above in that the proximity circuit 550 is configured to detect a capacitance change on existing electrodes or existing lines that are not directly used for the touch mode of operation. According to one embodiment, the existing electrodes and/or lines can include a ground plane electrode 570 of touchpad sensor array 510 and/or a guard ring electrode 580 of the touchpad sensor array 510. The proximity circuit 550 can be configured to drive the ground plane electrode 570 and sense the guard ring electrode 580. Alternatively, the proximity circuit 550 can drive the guard ring electrode 580 and sense the ground plane electrode 570. In certain embodiments, the electrodes and/or lines used by the touch circuit 540 for the touch detection mode of operation can also be used by the proximity circuit 550 for the proximity mode of operation. The additional electrodes and/or lines (e.g., the ground plane electrode 570 and/or a guard ring electrode 580) provide that a user's hand or finger may be detected at relatively greater distances from the touchpad system 500 as compared to touchpad systems without the additional electrodes (e.g., FIGS. 2 and 3). For example, a finger proximate to the touch system 500 may be detected by the guard ring 580/ground plane 570 electrodes and/or lines that would otherwise not be detected by the touch sensor array 510 proper due to the increased range provided by the guard ring 580 and ground plane 570. Detecting a user's hand at further distances from the touchpad system 500 reduces the latency that can occur from switching between the proximity mode to the touch mode of operation. A low latency period can make switching between proximity and touch modes virtually indiscernible to a user. According to some embodiments, the touch circuit 540 and proximity circuit 550 are configured to communicate via a set of communication lines 560, for example, during the switch between touch mode and proximity detection mode of the touchpad sensor array 510, as further described above with respect to FIG. 3.

Figure 6:
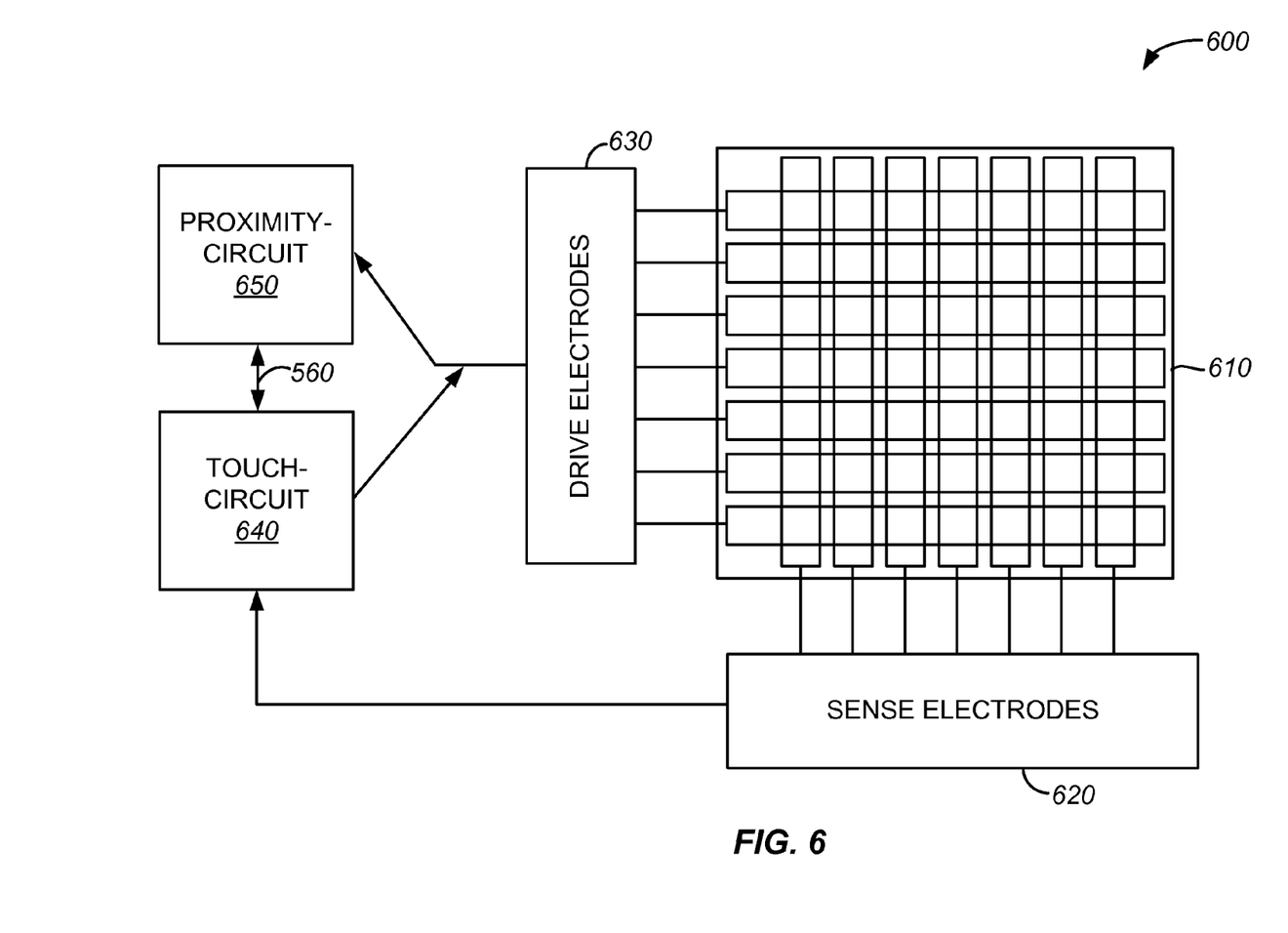
FIG. 6 is a simplified schematic of a touchpad system according to another alternative embodiment of the present invention.

FIG. 6 is a simplified schematic of a touchpad system 600 according to another alternative embodiment of the present invention. The touchpad system 600 includes a touchpad sensor array 610, a set of sense electrodes 620, a set of drive electrodes 630, a touch circuit 640, and a proximity circuit 650. The touchpad sensor array 610, sense electrodes 620, and drive electrodes 630 can be referred collectively as a "touchpad" or "touch-based interface." In certain embodiments, the touch circuit 640 and/or proximity circuit 650 can be a processor, a controller, an ASIC, or other control logic (e.g., PLD, FPGA) for executing the method and controlling the touch circuit 240 and/or proximity circuit 250. Alternatively, the set of sense electrodes 620 and set of drive electrodes 630 can be replaced by a set of sense lines (i.e., sense electronics) 620 and drive lines (i.e., drive electronics) 630, each including a multiplexor (MUX) to drive and/or sense each respective row and column of electrodes on the touchpad sensor array 610. The touchpad sensor array 610 is a mutual-capacitance sensor array. Alternatively, the touchpad sensor array 610 can be a self-capacitance sensor array or a resistive sensor array. It should be noted that the various embodiments (e.g., proximity detection and low power modes) described herein can also be applied to other touch-based technologies including, but not limited to, optical technology (e.g., LED) based touch systems using light in the visible and/or non-visible spectrums. In some embodiments, the touchpad system 600 can be a touchpad on a computing device (e.g., laptop computer, netbook, etc.). In other embodiments, the touchpad system 600 can be a touch screen (e.g., touch screen monitor, smart phone, PDA, etc.) where, for example, the touch sensitive elements are disposed above or below a display or screen. It should be noted that these are merely examples and the touch system 600 can be adapted for use in any electronic device as would be appreciated by one of ordinary skill in the art with the benefit of this disclosure.

In certain embodiments, the touch circuit 640 is in electronic communication with the proximity circuit 650. The touch circuit 640 is coupled to the drive electrodes 630 and the sense electrodes 620. The proximity circuit 650 is further coupled to the drive electrodes 630. Alternatively, the proximity circuit can be coupled to the sense electrodes 620. The touchpad sensor array 610, the set of sense electrodes 620, and the set of drive electrodes 630 are sometimes referred to herein collectively as a touchpad. According to one embodiment, the touchpad sensor array 610 is a mutual capacitance sensory array. Alternatively, the touchpad sensor array 600 can be a self-capacitance sensor array or a resistive touch pad.

In certain embodiments, the touch circuit 640 is an integrated circuit configured to detect signal changes from the touchpad sensor array 610. In certain embodiments, each row and column of the capacitive electrodes of the touchpad sensor array 610 are driven and sensed by the touch circuit 640 by way of the drive electrodes 630 and sense electrodes 620. Each column and row of electrodes are scanned sequentially in a predetermined order to provide the touch circuit with a "map" of the electrical field across the entire touchpad sensor array 610. Signal changes or fluctuations can be generated by a user touching the touchpad sensor array 610 with a finger or conductive object (e.g., stylus, etc.). The touch circuit 240 is configured to detect these signal fluctuations or distortions and generate position information of a user's finger on the touchpad and moving.

The proximity circuit 650 can be an integrated circuit configured to detect signal changes from the touchpad sensor array 610 generated by a user moving a finger or conductive object to within a proximity detection range of the touchpad sensor array 610. According to some embodiments, the proximity circuit 650 can detect a finger or conductive object from up to approximately 5 centimeters from the touch pad sensor array 610. In some embodiments, the proximity circuit 650 begins detections of a finger or conductive object after a predetermined period of inactivity. For example, if the touch circuit 640 does not detect a finger of conductive object at or near the touchpad sensor array 610 for a given amount of time (e.g., 5 seconds, 10 seconds, etc.), the touch circuit 640 is deactivated and the proximity circuit 650 is enabled (i.e., activated). The proximity circuit 650 is configured to place the touchpad system 600 in various power saving modes of operation during the period of inactivity, as further described above with respect to FIG. 3.

According to certain embodiments, the proximity circuit 650 is inactive (e.g., does not monitor the touchpad sensor array 610) while the touch circuit 640 is monitoring the touchpad sensor array 610. For example, the proximity circuit 650 can be electrically decoupled or isolated from the touchpad sensor array 610 via a set of switches, relays, high impedance mode, or the like where monitoring of the touchpad sensor array 610 by the touch circuit 640 is not effected by the proximity circuit 650. Methods of decoupling or electrically isolating the proximity circuit 650 from the touchpad sensor array 610 would be known by those of ordinary skill in the art with the benefit of this disclosure.

According to certain embodiments, the touch circuit 640 is inactive (e.g., does not monitor the touchpad sensor array 610) while the proximity circuit 650 is monitoring the touchpad sensor array 610. For example, the touch circuit 640 can be electrically decoupled or isolated from the touchpad sensor array 610 via a set of switches, relays, a high impedance mode, or the like where monitoring the touchpad sensor array 620 by the proximity circuit 650 is not effected by the touch circuit 640. Methods of decoupling or electrically isolating the touch circuit 640 from the touchpad sensor array 610 would be known by those of ordinary skill in the art with the benefit of this disclosure. According to some embodiments, the touch circuit 640 and proximity circuit 650 are configured to communicate via a set of communication lines 660, for example, during the transfer of the monitoring the touchpad sensor array 610.

Figure 7:
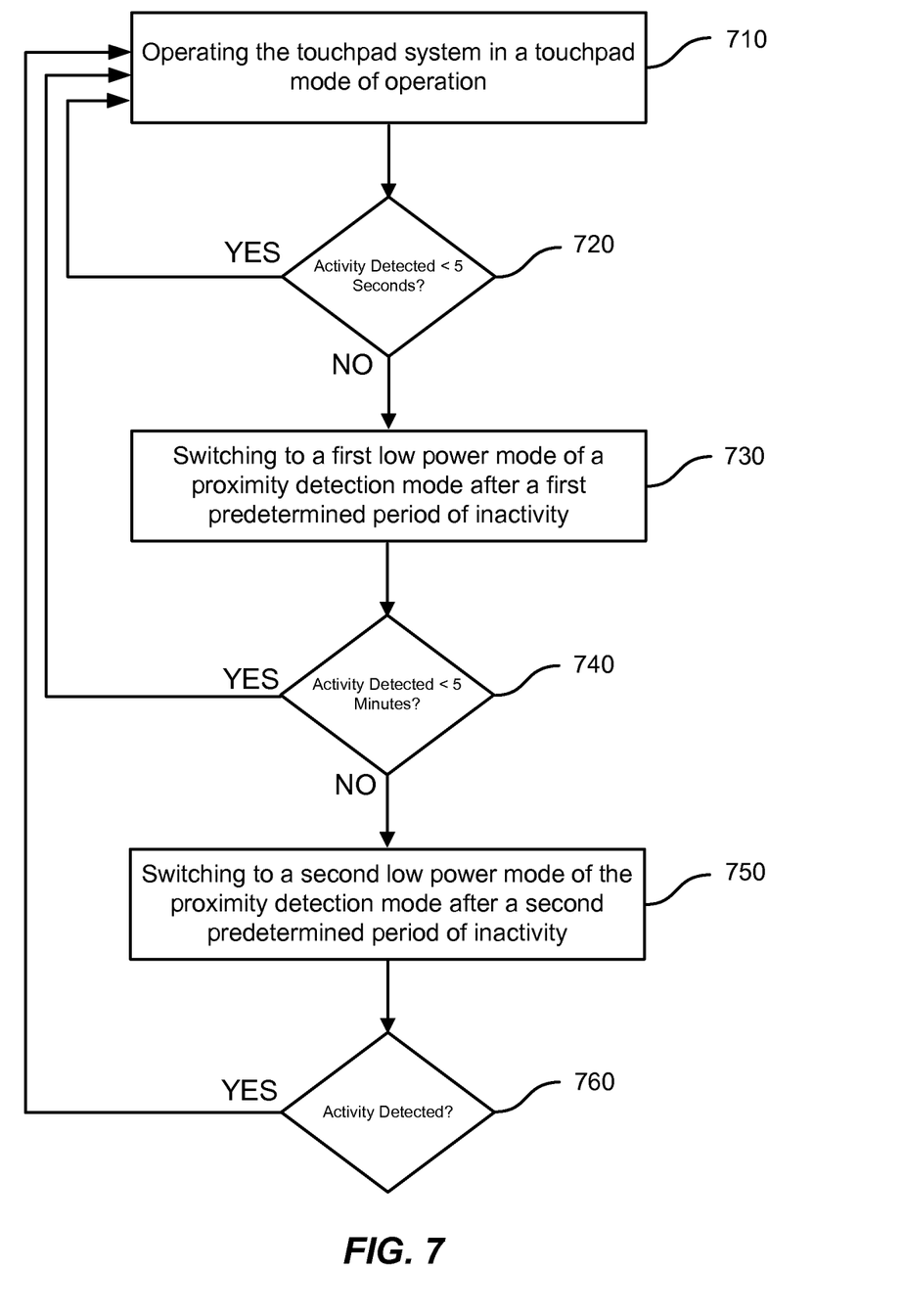
FIG. 7 is a simplified flow diagram illustrating a method for switching between modes of operation for the touchpad system.

FIG. 7 is a simplified flow diagram illustrating a method 700 for switching between modes of operation for the touchpad system 200. The method 700 is performed by processing logic that may comprise hardware (circuitry, dedicated logic, etc.), software (such as is run on a general purpose computing system or a dedicated machine), firmware (embedded software), or any combination thereof. In one embodiment, the method 700 is performed by both the touch circuit 240 and proximity circuit 250 of FIG. 2.

Referring to FIG. 7, the method 700 includes operating the touchpad system 200 in a touchpad mode of operation (710). As described above with respect to FIG. 2, the touchpad mode of operation can include the touch circuit 240 tracking the position of a finger or conductive object on the touchpad sensor array 210. In one exemplary case, the touch system 200 scans the touch sensor array 210 at a first polling rate (e.g., one scan or poll per 1 ms, etc.). The first polling rate can be set to any desirable rate that preferably scans a user's finger or a conductive object fast enough for a given application. In certain embodiments, the proximity detection mode (e.g., performed by proximity circuit 250) is inactive while the touchpad system 200 is in the touchpad mode (e.g., touch circuit 240 active).

The method also includes, when the touch system 200 detects user activity on the touch sensor array 210, remaining in the touchpad mode of operation where the touch system 200 continues to track the location of a finger or conductive object on the touch sensor array 210 (720). If the touch system 200 does not detect any activity (e.g., touch or movement of a finger or conductive object on the touch sensor array 210) within a first predetermined period of time (i.e., a first predetermined period of inactivity) (720), then the method continues to 730. It should be noted that the first period of inactivity can be set to any desired value. In an exemplary embodiment, the first predetermined period of inactivity is 5 seconds.

At 730, the touch system 200 switches from the touchpad mode of operation to a proximity detection mode of operation. The proximity detection mode can detect a presence and/or movement of a finger, stylus, conductive object, or the like, on or to within a certain distance of the touch sensor array 210. In some embodiments, the proximity detection mode can detect fingers or conductive objects up to 5 cm from the touch sensor array 210. It should be noted that the range of the proximity detection can be adapted shorter or longer distances (e.g., 3 cm, 10 cm, etc.) depending on the requirements of the design.

At 730, the proximity detection mode is in a first low power mode. The first low power mode reduces the polling rate of the touch pad sensor array 210 to effectively lower the power dissipation of the touch system 200. To illustrate, the touch mode of operation can operate at a first polling rate. The first polling rate is typically fast enough to accurately track a user's finger or conductive object on the touch sensor array 210 with a sufficiently high enough resolution for the given application. For example, the first polling rate can be one poll per millisecond. The first low power mode of the proximity detection mode operates at a second polling rate. The second polling rate can be configured to operate at a lower polling rate than the first polling rate. For example, the first low power mode may operate at 1 poll per 10 milliseconds. The reduced polling rate reduces the overall power dissipation of the touch system 200. It should be noted that a reduction in polling rate and tracking resolution in the proximity detection mode of operation may be acceptable because one purpose of the proximity detection mode is to simply detect a presence of a user or conductive object to prompt the touch system 200 to switch back to the touchpad mode of operation (710), not to accurately track the location of the user or conductive object on the touch sensor array 210. In certain embodiments, during the transition from the normal mode to the first low power mode, the proximity circuit 250 activates and the touch circuit 240 deactivates.

At 740, if the touch system 200 detects user activity on the touch sensor array 210, the method returns to 710 and returns to the touchpad mode of operation where the touch system 200 tracks the location of a finger or conductive object on the touch sensor array 210. At 740, if the touch system 200 does not detect any activity (e.g., touch or movement of a finger or conductive object on the touch sensor array 210) within a second predetermined period of time (i.e., a second predetermined period of inactivity), then the method continues to 750. It should be noted that the second period of inactivity can be set to any desired value, preferably longer than the first period of inactivity. In an exemplary embodiment, the second predetermined period of inactivity is 5 minutes.

At 750, the touch system 200 remains in the proximity detection mode of operation but switches from the first low power mode to a second lower power mode of operation. The proximity detection mode can detect a presence and/or movement of a finger, stylus, conductive object, or the like to within a certain distance of the touch sensor array 210. In some embodiments, the proximity detection mode can detect fingers or conductive objects up to 5 cm from the touch sensor array 210. It should be noted that the range of the proximity detection can be adapted shorter or longer distances (e.g., 3 cm, 10 cm, etc.) depending on the needs of the design.

In some embodiments, the second low power mode operates at a third polling rate. The third polling rate further reduces the polling rate of the touch pad sensor array 210 to effectively lower the power dissipation of the touch system 200. As illustrated above, the touch mode of operation can operate at a first polling rate (e.g., 1 poll per 1 ms), the first low power mode can operate at a second polling rate (e.g., 1 poll per 10 ms), and the second low power mode can operate at a third polling rate (e.g., 1 poll per 100 ms). Some embodiments of the invention may incorporate more low power modes with shorter or longer polling rates that can be triggered by a third, fourth, or fifth inactivity time, etc.

At 760, if the touch system 200 detects user activity on the touch sensor array 210, the method performs 710 and returns to the touchpad mode of operation. At 760, if the touch system 200 does not detect any activity (e.g., touch or movement of a finger or conductive object on the touch sensor array 210), then the method remains in the second low power mode of operation. Certain embodiments may employ additional low power modes of operation and adapting the method as such would be understood and appreciated by one of ordinary skill in the art with the benefit of this disclosure.

It should be appreciated that the specific steps illustrated in FIG. 7 provides a particular method of switching between modes of operation in a touch system 200, according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. In addition, the method 700 could be adapted to the touch systems of FIGS. 4-6. One of ordinary skill in the art would recognize and appreciate many variations, modifications, and alternatives of the method 700.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention. Furthermore, as noted above, the various embodiments of touch systems described herein can be adapted to support touch screen applications. For example, embodiments of the present invention can be used in devices and/or systems including control devices, remote controls, smart phones, tablet computers, portable media players, and the like.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A system comprising:
   a touch-based interface;
   a proximity circuit electronically coupled to the touch-based interface and configured to detect a change in an electrical property of the touch-based interface to detect a user adjacent to the touch-based interface but not touching the touch-based interface; and
   a touch circuit electronically coupled to the touch-based interface and configured to detect a change in an electrical property of the touch-based interface to detect a touch on the touch-based interface;
   wherein if the proximity circuit is electronically monitoring the touch-based interface, the touch circuit is electronically decoupled from the touch-based interface, and if the touch circuit is electronically monitoring the touch-based interface, the proximity circuit is electronically decoupled from the touch-based interface;
   wherein if the touch circuit is configured to monitor the touch-based interface for a touch mode of operation, after a first inactivity time of the touch-based interface, the proximity circuit is configured to monitor the touch-based interface for a proximity mode of operation and the touch circuit is electronically decoupled from the touch-based interface, and
   wherein if the proximity circuit is configured to monitor the touch-based interface, after a second inactivity time of the touch-based interface, a polling rate of the proximity circuit is reduced from a first polling rate to a second polling rate.

2. The system of claim 1, wherein the touch-based interface is a capacitive device.

3. The system of claim 1, wherein the touch-based interface includes:
   a touchpad sensor array;
   a set of drive electronics coupled to the touchpad sensor array and one or more of the touch circuit and proximity circuit; and
   a set of sense electronics coupled to the touchpad sensor array and one or more of the touch circuit and proximity circuit.

4. The system of claim 1, wherein the first inactivity time is 5 seconds or greater.

5. The system of claim 1, wherein the first polling rate is at least ten times faster than the second polling rate.

6. The system of claim 1, wherein the second inactivity time is 5 minutes or greater.

7. The system of claim 1, wherein if the proximity circuit detects a proximity event, the proximity circuit is electronically decoupled from the touch-based interface and the touchpad circuit is configured to monitor the touch-based interface.

8. The system of claim 1, wherein the proximity circuit and the touch circuit are discrete integrated circuits.

9. The system of claim 1, wherein the proximity circuit and the touch circuit are a single integrated circuit.

10. The system of claim 1, wherein the proximity circuit is configured to monitor one or more of electrodes and lines of the touch-based interface that are not monitored by the touch circuit in a touch mode.

11. The system of claim 10, wherein the touchpad includes a ground plane electrode and a guard ring electrode and the one or more of electrodes and lines include the ground plane electrode and the guard ring electrode.

12. A system comprising:
    one or more data processors;
    a non-transitory computer-readable storage medium coupled to the one or more data processors and comprising a plurality of computer-readable instructions tangibly embodied one the computer-readable storage medium, which, when executed by the one or more data processors, provide for operation of the system, the plurality of instructions comprising:
    instructions that cause the one of more data processor to operate the system in a touchpad mode having a first polling rate;
    instructions that cause the one of more data processor to determine a passage of a first predetermined period of inactivity;
    instructions that cause the one of more data processor to switch operation of the system to a proximity detection mode, wherein the proximity detection mode operates in a first low power mode having a second polling rate after the first predetermined period of inactivity,
    wherein the proximity detection mode operates a second low power mode having a third polling rate after a second predetermined period of inactivity,
    wherein the system consumes less power in the second low power mode that in the first low power mode, and wherein
    the second polling rate is slower that the first polling rate and wherein the third polling rate is slower that the second polling rate;

instructions that cause the one or more data processors to detect activity; and instructions that cause the one or more data processors to switch operation of the system to the touchpad mode.

13. The system of claim 12 wherein the first predetermined period of inactivity is 5 seconds or more, up to the second predetermined period of inactivity, and the second predetermined period of inactivity is 5 minutes or greater.

14. The system of claim 12 further comprising:
a touchpad sensor array;
drive lines coupled to the touchpad sensor array;
sense lines coupled to the touchpad sensor array;
a touch circuit coupled to the drive lines and sense lines, wherein the touch circuit executes the touchpad mode; and
a proximity detection circuit coupled to the touch circuit, wherein the proximity detection circuit executes the proximity detection mode, wherein the proximity detection circuit is inactive when the touch circuit is enabled and the touch circuit is inactive when the proximity detection circuit is enabled.

15. The system of claim 14 wherein the proximity detection mode is configured to detect activity from within 5 cm from the touchpad sensor array, wherein the activity includes one or more of a finger or conductive touch object.

16. A method of operating a system, the method comprising:
operating the system in a touchpad mode of operation;
determining passage of a first predetermined period of inactivity;
operating the system in a proximity detection mode of operation, wherein the proximity detection mode operates at a first power consumption level; determining passage of a second predetermined period of inactivity;
operating the proximity detection mode at a second power consumption level, wherein the second power consumption level is less that the first power consumption level;
detect activity; and
operating the system in the touchpad mode of operation, wherein the touchpad mode of operation is associated with a first polling rate;
the first power consumption level is associated with a second polling rate; and
the second power consumption level is associated with a third polling rate,
wherein the second polling rate is slower that the first polling rate and
wherein the third polling rate is slower that the second polling rate.

17. The method of claim 16 wherein the first predetermined period of inactivity is 5 seconds or more, up to the second predetermined period of inactivity, and the second predetermined period of inactivity is 5 minutes or greater.

18. The method of claim 16 wherein detecting activity comprises detecting activity from within 5 cm from a touchpad sensor array.

19. The method of claim 18 wherein detecting activity comprises detecting at least one of a finger or a conductive object.

* * * * *